(12) United States Patent
Shetty

(10) Patent No.: US 9,083,752 B2
(45) Date of Patent: Jul. 14, 2015

(54) MOBILE DEVICE MANAGEMENT AS A SIMPLIFIED ONLINE SOFTWARE SERVICE

(71) Applicant: Codeproof Technologies, Inc., Redmond, WA (US)

(72) Inventor: Satish Kumar Shetty, Redmond, WA (US)

( * ) Notice: Subject to any disclaimer, the term of this patent is extended or adjusted under 35 U.S.C. 154(b) by 0 days.

(21) Appl. No.: 14/043,796

(22) Filed: Oct. 1, 2013

(65) Prior Publication Data

US 2015/0095970 A1    Apr. 2, 2015

(51) Int. Cl.
*H04L 29/06* (2006.01)
*H04L 12/58* (2006.01)

(52) U.S. Cl.
CPC .............. *H04L 63/20* (2013.01); *H04L 51/00* (2013.01); *H04L 63/02* (2013.01)

(58) Field of Classification Search
CPC ......... H04L 63/20; H04W 12/08; G06F 3/048
USPC ........................................ 726/6, 30; 713/156
See application file for complete search history.

(56) References Cited

U.S. PATENT DOCUMENTS

| 2007/0006289 A1* | 1/2007 | Limont et al. ..................... 726/6 |
| 2009/0228973 A1* | 9/2009 | Kumar et al. .................... 726/15 |
| 2012/0129503 A1* | 5/2012 | Lindeman et al. ......... 455/414.1 |
| 2012/0244874 A1* | 9/2012 | Behairy et al. ............. 455/456.1 |
| 2014/0059347 A1* | 2/2014 | Dougherty et al. ........... 713/168 |

* cited by examiner

*Primary Examiner* — Dao Hao
(74) *Attorney, Agent, or Firm* — Steinberg IP Law LLC; Gloria M. Steinberg

(57) ABSTRACT

Technology is disclosed for implementing a mobile device management service. The technology includes a first computing device behind a first firewall, for providing device management as a software as a service that is configured to (a) receive one or more policies from an entity, the entity managing a second server computing device that is behind a second firewall, wherein the first firewall and the second firewall are different firewalls, further wherein at least one of the received policies is indicated to pertain to a group of mobile computing devices; and (b) upon receiving a communication from a mobile computing device belonging to the group of mobile computing devices, transmit to the mobile computing device the received policy pertaining to the group of mobile computing devices, wherein the received policy specifies a condition for future communications between the mobile computing device and the second server computing device.

16 Claims, 7 Drawing Sheets

MOBILE DEVICE MANAGEMENT AS A SIMPLIFIED ONLINE SOFTWARE SERVICE

BACKGROUND

The use of mobile computing devices has become quite commonplace. Examples of mobile computing devices currently in use are "smartphones," computing tablets, laptop computers, and so forth. Wearable computing devices are on the horizon. Because mobile computing devices are convenient to use because they enable people to be "connected" to communications and data from almost anywhere, users often store not only personal data on such devices, but also private data, trade secret data, or indeed almost any type of data belonging to organizations (e.g., commercial enterprises, government entities, etc.) with which the users are affiliated. Indeed, organizations have become accustomed to permitting their employees or other stakeholders to access corporate data remotely using personally owned mobile computing devices. In the art, this has come to be known as "bring your own device" ("BYOD").

Organizations sometimes rely on mobile device management ("MDM") software to manage risks associated with use of mobile computing devices by employees and other agents of the organizations. For example, because mobile computing devices are often lightweight, they are easy to lose. When users lose their mobile computing devices, it may become possible for third parties to retrieve the data stored thereon, e.g., for malicious purposes. To mitigate malicious use or other misuse of their data stored on mobile computing devices, an information technology (IT) administrator associated with the organization can use the MDM software to send commands to a lost or misplaced mobile computing device, e.g., to delete all data, lock the mobile computing device to prevent use, etc.

Organizations can also use MDM software to enforce various policies, e.g., to require a device password of a specified "strength," enforce data access policies, data retention policies, etc. As an example, the IT administrator can use the MDM software to specify or update a policy that applies to a group of mobile computing devices instead of having to specify or update the policy (e.g., manually) for each mobile computing device in the group.

Manufacturers of mobile computing devices have enabled MDM features, e.g., as part of their operating systems. For example, Apple's iOS, Google's Android, and Microsoft Windows Mobile operating systems all provide MDM features. These features enable organizations to "enroll" the devices into their enterprise computing environment, configure and/or update device settings, monitor and/or enforce compliance with corporate data policies, and remotely delete data and/or lock the enrolled devices.

To take advantage of these features, organizations must typically install, integrate, and manage third party MDM servers as part of their data center environments. For example, various companies commercialize MDM servers or appliances that can assist an organization to take advantage of the MDM features mobile computing device manufacturers provide. In these cases, an IT administrator can create a configuration profile document that is stored at the MDM server. A user desiring to enroll their mobile computing device can initiate a connection to the MDM server (e.g., by identifying an IP number, domain name, email address, etc.). The MDM server can then transmit the configuration profile document to the mobile computing device. The user then accepts (or installs) the configuration profile document. Once completed, the mobile computing device is "enrolled," and can then access corporate data, electronic mail ("e-mail"), etc. The mobile computing device can enforce the policies stipulated in the configuration profile document (e.g., password requirements, etc.) If the mobile computing device is no longer in compliance, the MDM features of the mobile computing device can prevent further communications. Alternatively, there may be periodic communications between the mobile computing device and the MDM server (or other server) of the organization to ensure that the mobile computing device continues to abide by the policies. Furthermore, when the organization updates its policies, the mobile computing device may need to download and install the revised policies before further communications are permitted. If the mobile computing device is reported as lost or stolen, the IT administrator can cause the MDM server to transmit commands to the mobile computing device, e.g., to delete data, lock the device, retrieve the location of the device, etc.

However, installing, configuring, and maintaining MDM servers is an added expense both in terms of capital expenditure as well as time required of IT administrators.

DETAILED DESCRIPTION

Figure 1:
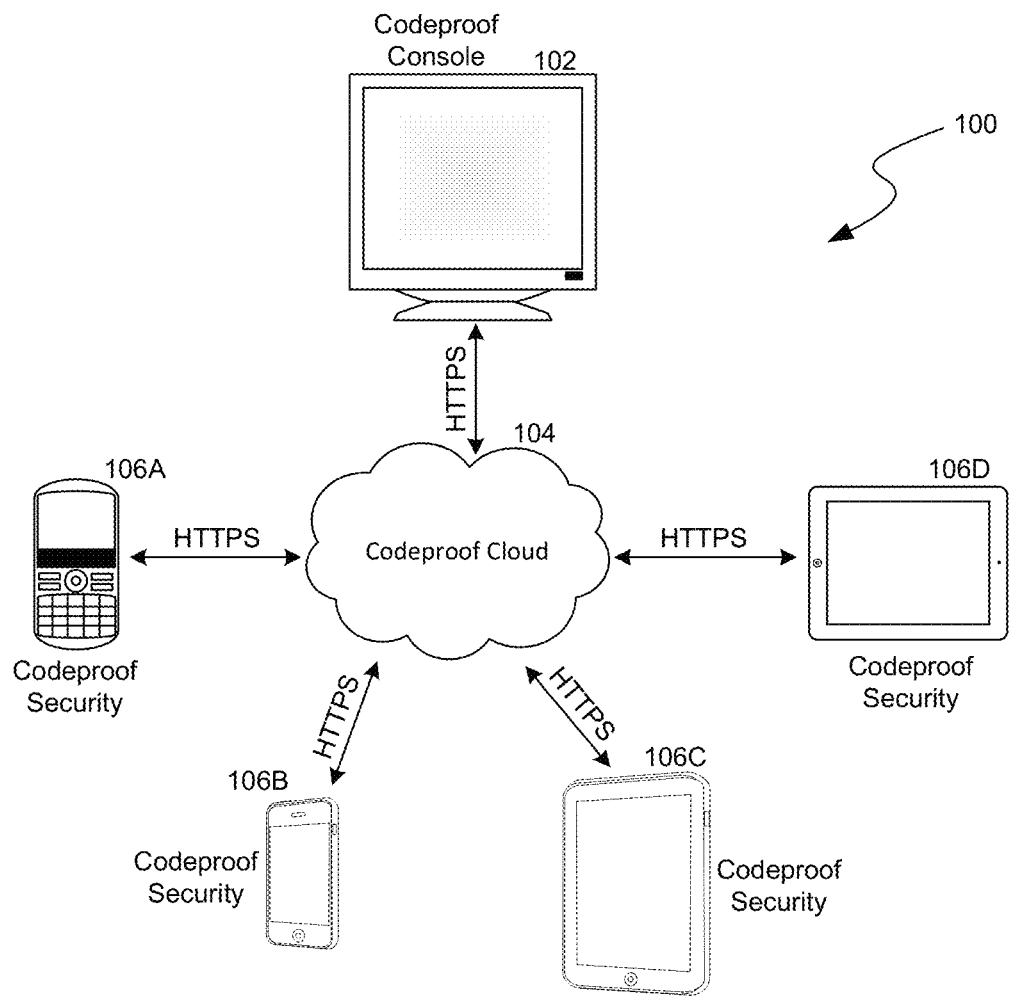
FIG. 1 is a block diagram illustrating an environment in which the disclosed technology may operate in various embodiments.

Codeproof Technologies Inc., the assignee of the instant patent application, has invented technology to provide mobile device management (MDM) using a Software as a Service (SaaS) model. The technology makes policy management for mobile computing devices more simple and economical than deploying MDM servers within an organization's information technology (IT) environment. Using the technology, an IT administrator can remotely enforce group policies, e.g., password "strength" requirements, configure network communications settings, enforce access (e.g., execution) rights to applications, delete data, lock mobile computing devices, remove or reset passwords, etc. The technology enables these features without requiring an MDM server to be installed within an organization's IT environment (e.g., "behind" the organization's firewall).

In some embodiments, the technology enforces location-based policies, which is sometimes referred to as "geofencing." When a mobile computing device is within a first geographical area (e.g., as determined using a GPS device associated with the mobile computing device), the technology may impose a first set of policies. The first set of policies may include, e.g., preventing use of a camera device associated with the mobile computing device. Once the mobile computing device moves outside the first geographical area (e.g., to a second geographical area), the technology may impose a second set of policies. The second set of policies may enable use of the camera device. In various embodiments, both sets of policies may be provided to the mobile computing device upon installation or configuration of the technology. In other embodiments, the policies may be provided to the mobile computing device upon detection of the present location of the mobile computing device.

In various embodiments, the technology includes an ability to "whitelist" and/or "blacklist" applications. An administrator can provide a "whitelist" identifying applications that are allowed to be installed and/or executed. When an application is listed in the whitelist, the technology permits the mobile computing device to execute the listed application, but may prevent all other applications (e.g., not listed in the whitelist) from being executed. Alternatively, an administrator can provide a "blacklist" identifying applications that are disallowed. When an application is listed in the blacklist, the technology prevents the mobile computing device from executing the listed application, but may permit all other applications (e.g., not listed in the blacklist) to execute. In general, an administrator may provide either a whitelist or a blacklist, but not both.

Several embodiments of the described technology are described in more detail in reference to the Figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that may store instructions that implement at least portions of the described technology. In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

Turning now to the figures, FIG. 1 is a block diagram illustrating an environment in which the disclosed technology may operate in various embodiments. The environment 100 includes a cloud console 102, a cloud 104, and multiple computing devices 106, e.g., 106A, 106B, 106C, and 106D. The cloud console 102 is a computing device that an IT administrator can use, e.g., to configure the technology, monitor the technology, add or update policies, require or reset passwords on mobile computing devices, delete data stored on mobile computing devices, etc. The cloud console 102 can communicate via the cloud 104 with the mobile computing devices that the IT administrator is capable of managing remotely. The cloud 104 can be the Internet or indeed any other type of network. In various embodiments, communications between the cloud console and the managed mobile computing devices can employ encrypted communications means, e.g., a secure hypertext transfer protocol (e.g., HTTPS). The mobile computing devices 106A-D can be, e.g., smartphones, tablet computing devices, laptop computing devices, or indeed any other type of mobile computing device that users can use to access and/or store data.

Figure 2:
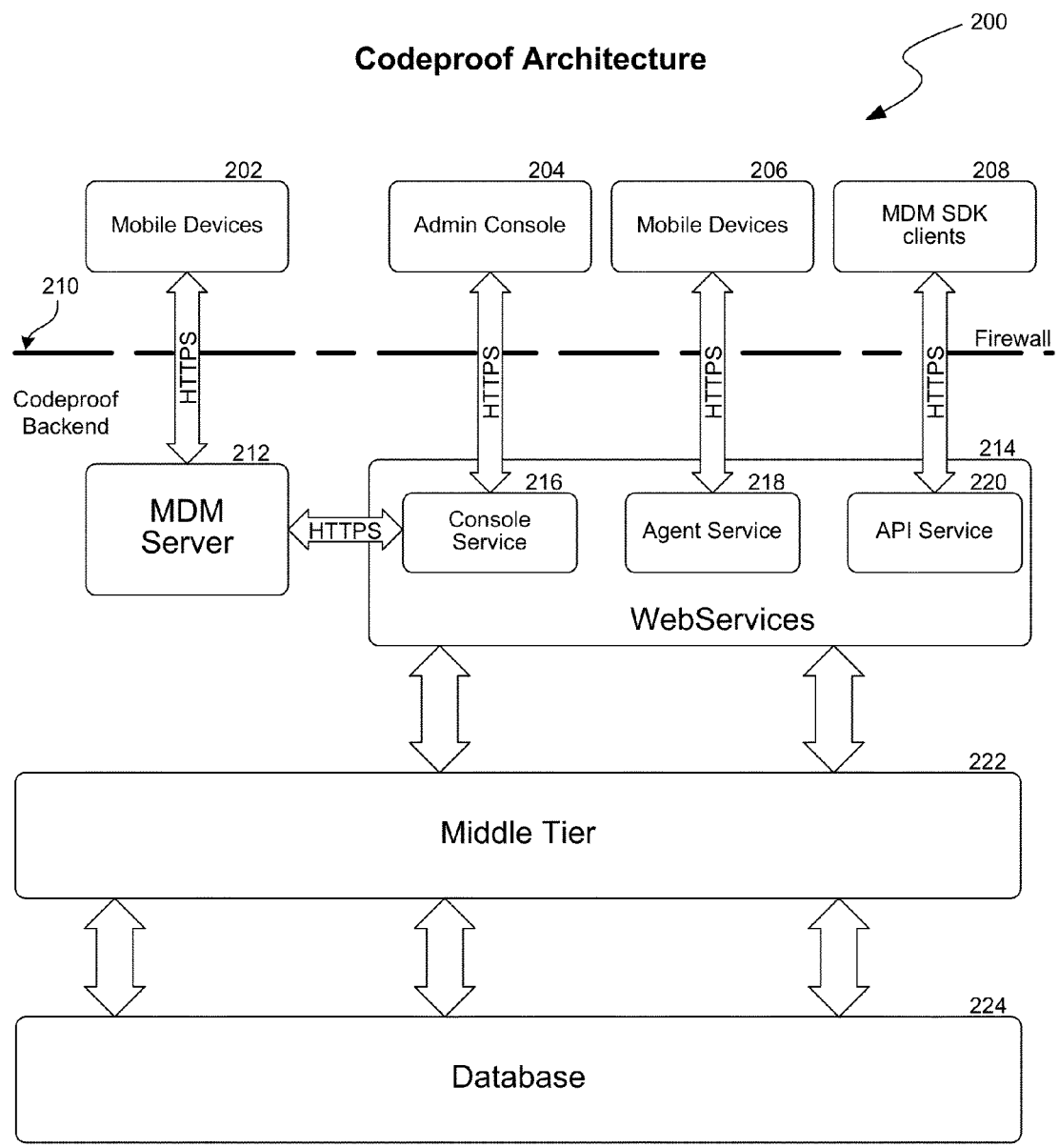
FIG. 2 is a block diagram illustrating an architecture of the disclosed technology, consistent with various embodiments.

FIG. 2 is a block diagram illustrating an architecture 200 of the disclosed technology, consistent with various embodiments. The environment 200 can include computing devices or components "in front of" a firewall 210 or "behind" the firewall 210. When a device or component is in front of the firewall 210, it is considered To be an untrusted device, whereas when the device or component is behind the firewall 210, it is considered to be a trusted device. The firewall 210 is associated with the technology and not with an organization or other entity that employs the technology. In front of the firewall 210, the environment 200 includes one or more mobile devices 202, an administrative console 204, multiple mobile devices 206, and a software development kit (SDK) 208. Behind the firewall 210, the environment 200 includes an MDM server 212, a Web services component 214, a middle tier 222, and a database 224. The Web services components 214 can include a console service 216, an agent service 218, and an application programmatic interface (API) service 220.

In various embodiments, the MDM server 212 May be employed to monitor and manage mobile devices 202, e.g., mobile devices that may be incompatible with management via a SaaS. model. Alternatively or additionally, some mobile computing device manufacturers may require use of an MDM server. The MDM server may communicate with mobile computing devices 202, e.g., using a secure hypertext transfer protocol or other data communications protocol. The MDM server 212 may also communicate with the Web services component 214, e.g., to receive or update information pertinent to mobile computing devices 202. As an example, the MDM server 212 may receive policy information from the Web services components 214 and transmit the received policy information to the mobile computing devices 202. In some embodiments, the mobile computing devices 202 can be used to manage "backend" elements of the technology, e.g., via the MDM server 212. The backend elements of the technology include the elements illustrated as being behind the firewall 210.

The Web services components 214 communicate with the administrative console 204, mobile computing devices 206, clients of the SDK 208, and also with the middle tier 222. In various embodiments, an IT administrator can use the administrative console 204 to communicate with the console service 216, e.g., using a secure networking protocol to monitor or control the technology. As an example, the administrator can create or update policies using the administrative console 204. Upon receiving commands from the administrative console 204, the console service 216 can take various actions behind the firewall 210. As examples, the console service 216 can retrieve policies via the middle tier 222, update policies via the middle tier 222, delete data stored on mobile computing devices 206, require or reset passwords on mobile computing devices 206, etc. In various embodiments, the console service 216 may communicate with the mobile computing devices 206 via the agent service 218.

One or more MDM SDK clients 208 may communicate with the API service 220, e.g., to enable custom application development to interact with the technology. As an example, in a manner similar to providers of MDM servers that can communicate with mobile computing devices provided by various manufacturers, it may be possible for various software vendors and service providers to interact with the technology.

The middle tier 222 can provide business logic, e.g., policies for use of mobile computing devices. Examples of policies include, e.g., whether a password is required to access the mobile computing devices, the "strength" of the password, which applications can be installed or used while accessing data belonging to organization, configuration requirements for the mobile computing device or installed applications, data storage and/or retention requirements, etc. Information relating to these policies may be stored in a database 224. In various embodiments, all features provided by the MDM features of the mobile computing device may be available for configuration via the technology.

In various embodiments, the console service may be publicly available, e.g., to users of the technology, via the administrative console 204, at the agent service 218 and/or the API service 220 may provide private interfaces, e.g., that are available only to other elements of the technology, e.g., software executing at enrolled mobile computing devices 206.

In some embodiments, the providers of MDM features on mobile computing devices may require digital certificates, e.g., to validate an MDM service provider. As an example, each mobile device manufacturer may require a separate digital certificate. In general, each entity (e.g., organization) that requires MDM services must purchase a digital certificate. In various embodiments, the technology is capable of sharing a digital certificate across multiple entities because the technology implements the MDM services and not the entities that employ the technology. Thus, small and medium-sized entities can save capital required to acquire and manage digital certificates.

Figure 3:
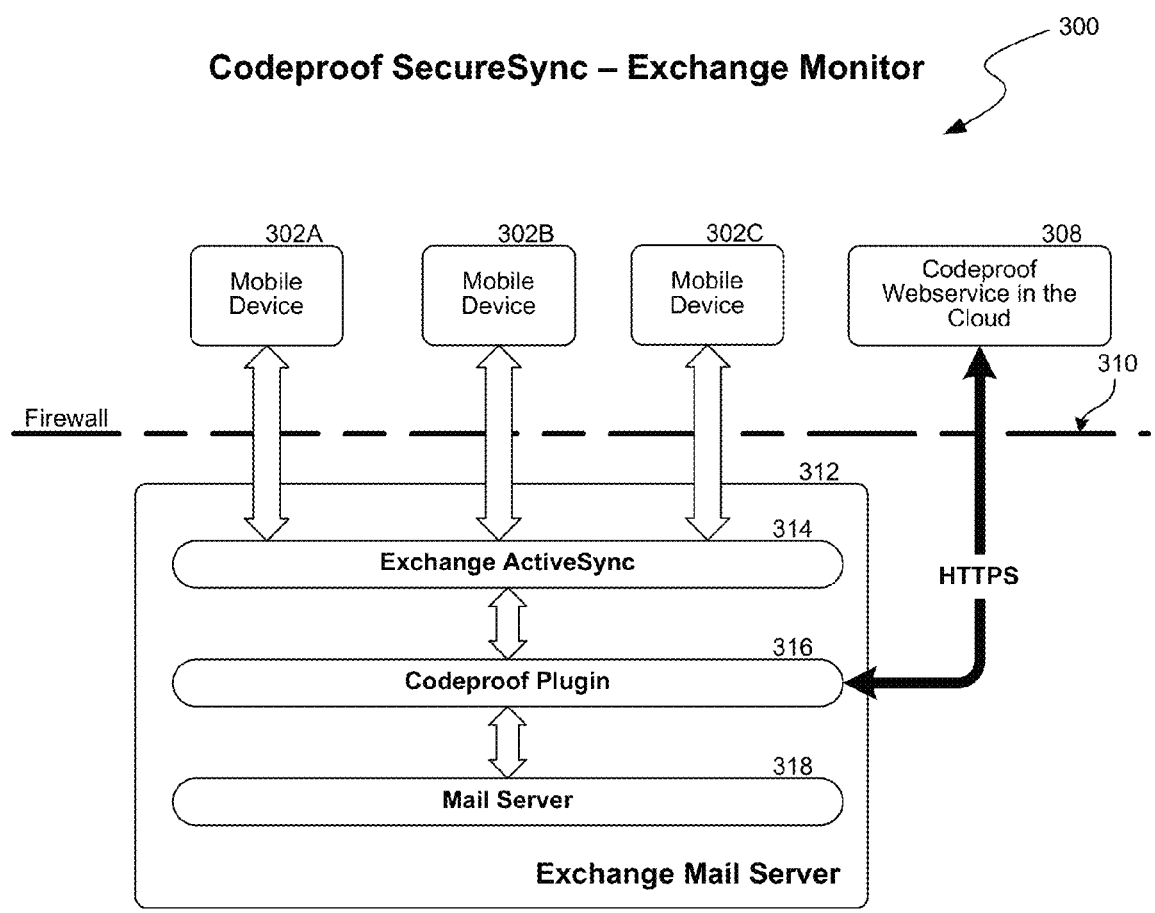
FIG. 3 is a block diagram illustrating an architecture of the disclosed technology, consistent with various embodiments.

FIG. 3 is a block diagram illustrating an architecture 300 of the disclosed technology, consistent with various embodiments. The architecture 300 relates to using the technology in Association with a mail server, e.g., MICROSOFT® EXCHANGE, to implement policies relating to use of electronic mail. Using the technology, an IT administrator can enforce password and other policies failing which users may be unable to use their mobile computing devices to send or receive electronic mail in association with their organizational electronic mail account. In various embodiments, the architecture 300 includes one or more mobile computing devices, e.g., mobile computing devices 302A, 302B, and 302C. although three mobile computing devices are illustrated, the technology is capable of operating with fewer or more mobile computing devices. The architecture 300 also includes a Web service 308. In various embodiments, the Web service 308 can be similar to Web services 214 discussed above in relation to FIG. 2. The mobile computing devices 302A-C and the Web service 308 can be on one side of an organizational firewall 310 and the organization's EXCHANGE mail server 312 can be on the other side of the organizational firewall 310. The organization's EXCHANGE mail server 312 includes standard EXCHANGE components mail server 318 and ACTIVESYNC® 314. The ACTIVESYNC® component synchronizes electronic mail between the EXCHANGE server and electronic mail client applications, e.g., applications executing at mobile computing devices 302A-C. The technology includes a plug-in 316 that can intercept communications between the mail server 318 and ACTIVESYNC® 314, e.g., enforce policies received from the Web service 308. As examples, the policies can specify whether and when the mobile computing device can receive e-mail, transmit e-mail, etc.

Figure 4:
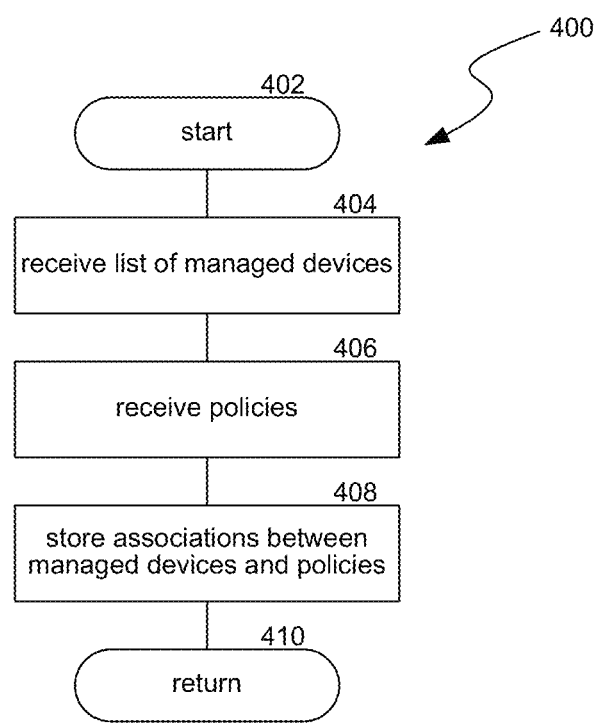
FIG. 4 is a flow diagram illustrating a routine implemented by the disclosed technology in various embodiments.

FIG. 4 is a flow diagram illustrating a routine 400 implemented by the disclosed technology in various embodiments. The routine 400 may be invoked, e.g., when the technology receives a list of policies. The routine 400 begins at block 402. At block 404, the routine receives a list of managed computing devices e.g., mobile computing devices. At block 406, the routine 400 receives a list of policies. In various embodiments, the received policies can be associated with one or more mobile computing devices identified in the received list of managed computing devices. As an example, the policies may be "inherited" from other policies. As an example, a first group may be provided a set of policies and a second group may inherit from the policies provided for the first group. The policies for the second group can include additional or fewer restrictions than the policies for the first group. At block 408, the routine 400 stores associations between the managed computing devices and the received policies, e.g., in a database. The routine returns at block 410. A first group can be based on a large geographical area, e.g., "North America." A second group may be a smaller subset of the large geographical area, e.g., "United States of America." The North America group may have a particular policy and the United States of America group may initially inherit the North America policy, but then the administrator may specify that aspects of the inherited policy are to be modified. As an example, the administrator may specify that mobile devices in the United States subgroup can employ (or not employ) applications that other mobile devices in the North America group cannot employ (or can employ). The policies can specify use of hardware components (e.g., camera) or software components (e.g., applications).

Suppose a HOME group includes subgroup A and subgroup C; and subgroup A includes subgroup B. Suppose further that subgroup B includes three mobile computing devices: Device-1, Device-2 and Device-3. In various embodiments, Device-1, Device-2 and Device-3 may each inherit default policies from the HOME node. If an administrator desires to override the inherited policies, the administrator can change the policies at the subgroup A level or the subgroup B level, or even at the specific node's level. For example, if the administrator overrides a camera policy to block camera use at the Device-1 node, the user of Device-1 will be unable to use the camera. On the other hand, users of Device-2 and Device-3 will be able to use their cameras if the inherited policy enables use of the camera. If the administrator desires to block cameras in all 3 mobile devices, the administrator can do so by overriding a "camera enable policy" at the subgroup B level. Overriding aspects of an inherited policy (e.g., use of a camera or application) may not override other aspects of the inherited policy (e.g., use of other hardware or software components).

Those skilled in the art will appreciate that the logic illustrated in FIG. 4 and described above, and in each of the flow diagrams discussed below, may be altered in a variety of ways. For example, the order of the logic may be rearranged, substeps may be performed in parallel, illustrated logic may be omitted, other logic may be included, etc.

Figure 5:
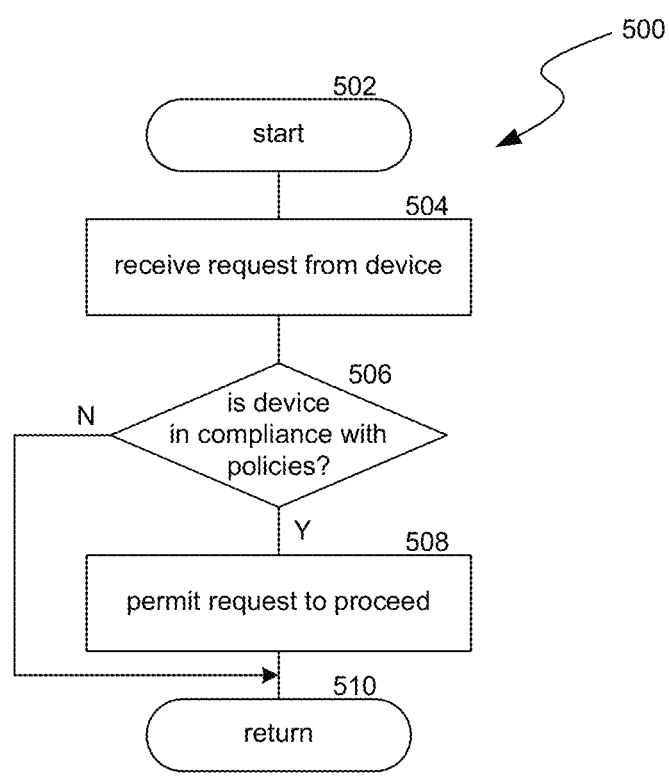
FIG. 5 is a flow diagram illustrating a routine implemented by the disclosed technology in various embodiments.

FIG. 5 is a flow diagram illustrating a routine 500 implemented by the disclosed technology in various embodiments. The routine 500 may be invoked, e.g., when the technology receives a request from a mobile computing device or a user of the mobile computing device. In various embodiments, the routine 500 may execute either at the mobile computing device or at a server computing device. The routine 500 begins at block 502. At block 504, the routine receives a request, e.g. from the mobile computing device or its user. At decision block 506, the routine determines whether the mobile computing device complies with one or more policies. As an example, the routine 500 may verify compliance using a document that the technology previously received from an IT administrator. If the mobile computing device is in compliance, the routine continues at block 508. Otherwise, the routine returns at block 510. At block 508, the routine permits the seat request to proceed. Examples of requests can include, e.g., access to data stored at a server or client, access to e-mail, etc. The routine then returns at block 510.

Figure 6:
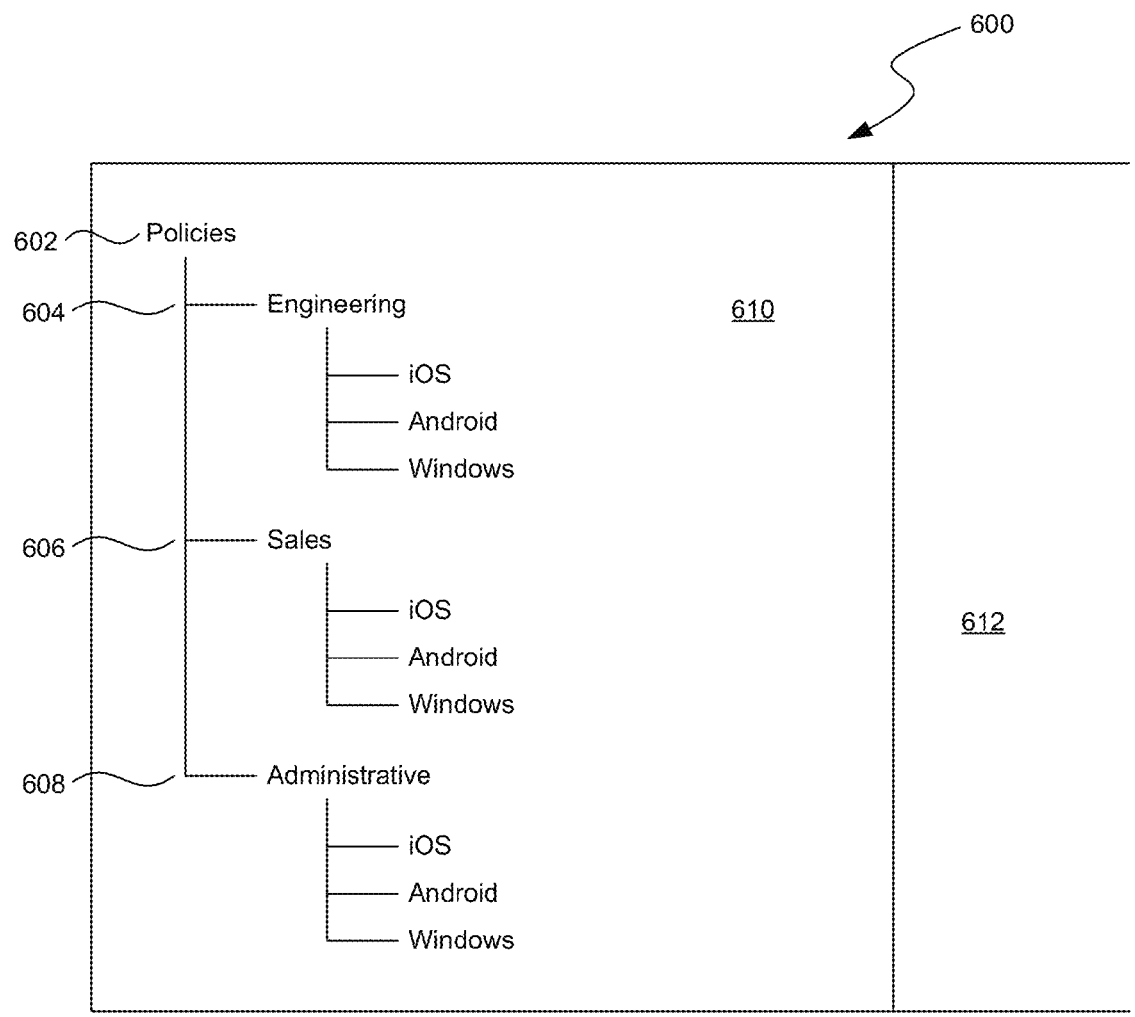
FIG. 6 is a user interface diagram illustrating a user interface provided by the disclosed technology in various embodiments.

FIG. 6 is a user interface diagram illustrating a user interface 600 provided by the disclosed technology in various embodiments. The user interface 600 may be a portion of a larger user interface that the technology may provide to a cloud console computing device 102 (illustrated in discussed above in respect to FIG. 1). The user interface 600 and can include a tree view 602 of policies. The tree view can identify multiple groups, e.g., an engineering group 604, a sales group 606, and an administrative group 608. One or more of the groups may have policies that inherit from policies of other groups. As an example, the administrative group 608 may inherit policies from the sales group 606. Each of the groups may have policies directed to different types of mobile computing devices. As an example, the engineering group 604 has policies 610 directed to iOS, Android, and Windows Mobile operating systems. Thus, using the technology, an IT administrator can specify various rules associated with each different type of mobile computing device that users of the IT administrator's organization may use. Upon selection of a policy, region 612 may illustrate details of the policy, e.g., for the IT administrator to configure according to the organization's requirements.

Figure 7:
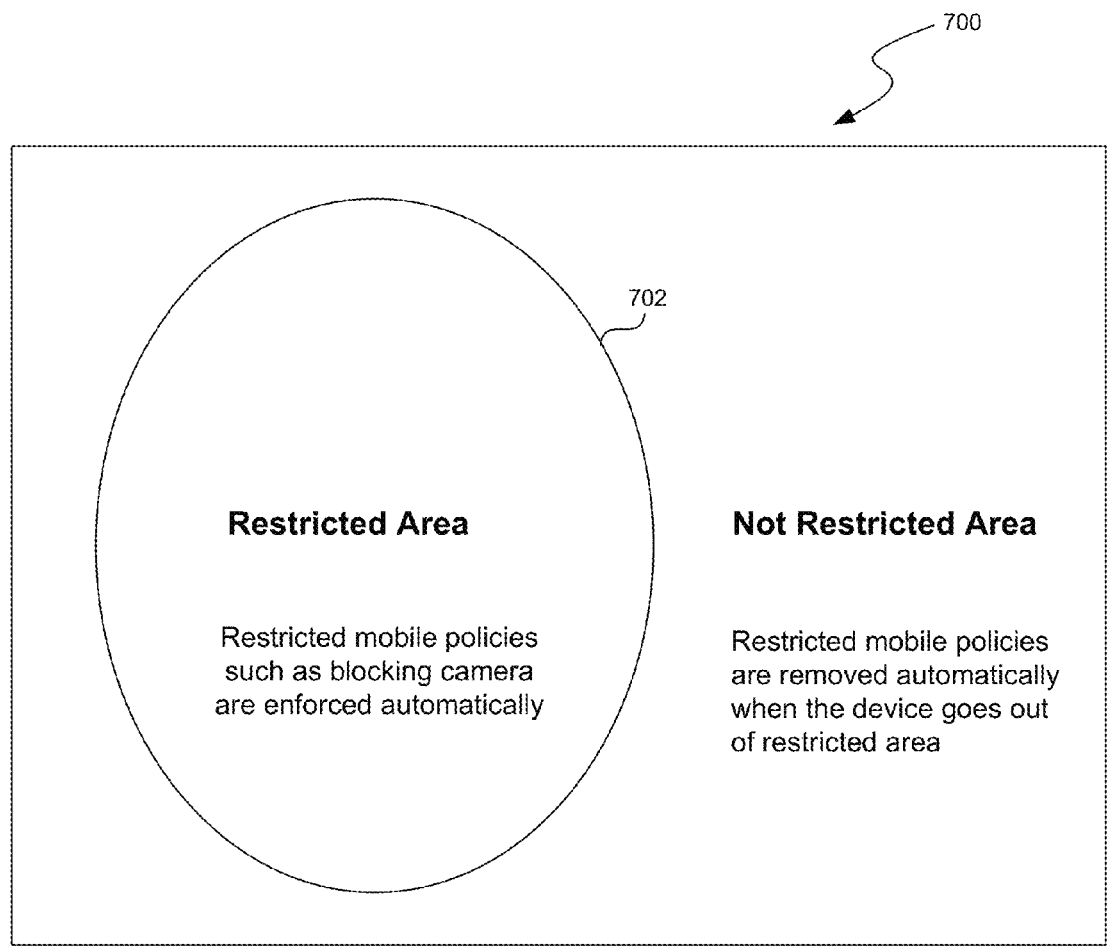
FIG. 7 is a chart diagram illustrating geofencing consistent with various embodiments.

FIG. 7 is a chart diagram illustrating genfencing consistent with various embodiments. A geographical area includes a restricted area 702. When the mobile computing device is within the restricted area 702, various policies may cause restrictions on use of hardware and/or software (e.g., camera, applications, etc.). When the mobile computing device is outside the restricted area 702, the restrictions may be removed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

I claim:

1. A method, performed by a first server computing device implementing a mobile device management device, the first server computing device behind a first firewall, for providing device management as a software as a service, comprising the steps of:

communicating with a middle tier via a web services component to retrieve one or more policies from an entity, the entity managing a second server computing device that is behind a second firewall, wherein the first firewall and the second firewall are different firewalls, further wherein at least one of the received policies is indicated to pertain to a group of mobile computing devices;

upon receiving a communication from a mobile computing device belonging to the group of mobile computing devices, transmitting to the mobile computing device the received policy pertaining to the group of mobile computing devices, wherein the received policy specifies a condition for future communications between the mobile computing device and the second server computing device, further wherein the first server computing device has a digital certificate relating to the mobile device management service and the second server computing device does not have a digital certificate relating to the mobile device management service;

enforcing the received policy via a plugin component that communicates with the middle tier via the web services component, wherein the plugin component is installed in the second server computing device;

receiving one or more policies from a second entity, the second entity managing a third server that is behind a third firewall, wherein the first firewall, the second firewall, and the third firewall are different firewalls, further wherein at least one of the received policies is indicated to pertain to a second group of mobile computing devices, and the third server does not have a digital certificate relating to the mobile device management device; and permitting or disallowing actions when the mobile device is within a specified geographical area.

2. The method of claim 1, further comprising the steps of:
providing an expandable user interface to enable an administrator to select the group of mobile computing devices and configure the policy pertaining to the group of mobile computing devices.

3. The method of claim 1, further comprising the steps of:
providing a mobile device management application programmatic interface (API), wherein software executing at a mobile computing device can employ the API to communicate with the first server computing device.

4. The method of claim 1, wherein the second server computing device is an electronic mail server that receives information from the first server computing device and determines whether to enable electronic mail communications between mobile computing device and the electronic mail server.

5. The method of claim 1, wherein the policy pertaining to the group of mobile computing device inherits aspects of a policy from a different policy pertaining to a group of mobile computing devices.

6. A non-transitory computer-readable recording medium comprising:

instructions for communicating with a middle tier via a web services component to receive one or more policies from an entity, the entity managing a second server computing device that is behind a second firewall, wherein at least one of the received policies is indicated to pertain to a group of mobile computing devices;

instructions for transmitting, upon receiving a communication from a mobile computing device belonging to the group of mobile computing devices, to the mobile computing device the received policy pertaining to the group of mobile computing devices, wherein the received policy specifies a condition for future communications between the mobile computing devices and the second server computing device, further wherein the second server computing device does not have a digital certificate relating to the mobile device management service;

instructions for enforcing the received policy via a plugin component that communicates with the middle tier via the web services component, wherein the plugin component is installed in the second server computing device;

instructions for receiving one or more policies from a second entity, the second entity managing a third server that is behind a third firewall, wherein the second firewall and the third firewall are different firewalls, further wherein at least one of the received policies is indicated to pertain to a second group of mobile computing devices, and the third server does not have a digital certificate relating to the mobile device management device; and instructions for permitting actions when the mobile computing device is located in an unrestricted area and disallowing actions when the mobile computing device is located in a restricted area.

7. The non-transitory computer-readable recording medium of claim 6, further comprising instructions for providing an expandable user interface to enable an administrator to select the group of mobile computing devices and configure the policy pertaining to the group of mobile computing devices.

8. The non-transitory computer-readable recording medium of claim 6, further comprising instructions for providing a mobile device management application programmatic interface (API), wherein software executing at a mobile computing device can employ the API to communicate with a first server computing device, wherein the first server computing device has a digital certificate relating to the mobile device management service.

9. The non-transitory computer-readable recording medium of claim 6, further comprising instructions defining a component, operating in association with an electronic mail server operating behind the second firewall, that receives information from a first server computing device and determines whether to enable electronic mail communications between mobile computing device and electronic mail server, wherein the first server computing device has a digital certificate relating to the mobile device management service.

10. The non-transitory computer-readable recording medium of claim 6, wherein the policy pertaining to the group of mobile computing device inherits aspects of a policy from a different policy pertaining to a different group of mobile computing devices.

11. A system comprising:
a group of mobile computing devices;
a first server computing device implementing a mobile device management service for providing device management as a software as a service, the first server computing device behind a first firewall, wherein upon receiving an enrollment request from a mobile computing device belonging to the group of mobile computing devices, transmits a document to the mobile computing device to enforce at least one policy, further wherein the first server computing device has a digital certificate relating to the mobile device management service;
the first server computer device communicating with a middle tier via a web services component to retrieve the policy from an entity, the entity managing a second server computing device that is behind a second firewall, wherein the first firewall and the second firewall are different firewalls, wherein the second server computing device transmits the document to the first server computing device, wherein second server computing device behind the second firewall exchanges information with the mobile computing device only if the mobile computing device complies with the policy, further wherein the second server computing device does not have a digital certificate relating to the mobile device management service;
the second server computing device having a plugin component that communicates with the middle tier via the web services component to enforce the policy, wherein the policy specifies permitted or disallowed actions when the mobile computing device is located within a specified geographical area; and
the first server computer device communicating with the middle tier via the web services component to retrieve the policy from a second entity, the second entity managing a third server computing device that is behind a third firewall, wherein the first firewall, the second firewall, and the third firewall are different firewalls, wherein the third server computing device transmits the document to the first server computing device, wherein third server computing device behind the third firewall exchanges information with the mobile computing device only if the mobile computing device complies with the policy, further wherein the third server computing device does not have a digital certificate relating to the mobile device management service.

12. The system of claim 11, further comprising an administrator console configured to enable an administrator to configure the policy.

13. The system of claim 11, further comprising an application programmatic interface (API) service associated with the first server computing device.

14. The system of claim 11, wherein data on at least one mobile computing device belonging to the group of mobile computing devices is deleted upon receiving a command from the first server computing device.

15. The system of claim 11, wherein data on at least one mobile computing device belonging to the group of mobile computing devices is unable to exchange data with the second server computing device because it does not comply with a password policy.

16. The system of claim 11, wherein the policy specifies a whitelist or blacklist, wherein the whitelist specifies the only applications that the mobile computing device is permitted to execute and the blacklist specifies the applications that the mobile computing device is not permitted to execute.

* * * * *